(12) United States Patent
Belcea (10) Patent No.: US 7,489,904 B2
(45) Date of Patent: Feb. 10, 2009

(54) METHOD AND SYSTEM FOR DETERMINING THE TIME OF ARRIVAL OF A DIRECT RADIO SIGNAL

(75) Inventor: John M. Belcea, West Melbourne, FL (US)

(73) Assignee: Motorola, Inc., Schaumburg, IL (US)

(*) Notice: Subject to any disclaimer, the term of this patent is extended or adjusted under 35 U.S.C. 154(b) by 517 days.

(21) Appl. No.: 11/301,703

(22) Filed: Dec. 13, 2005

(65) Prior Publication Data

US 2007/0135054 A1 Jun. 14, 2007

(51) Int. Cl.
H04B 17/00 (2006.01)

(52) U.S. Cl. .............. 455/67.11; 455/67.16; 455/456.1; 375/343

(58) Field of Classification Search .............. 455/67.11, 455/67.16, 456.1; 375/343
See application file for complete search history.

(56) References Cited

U.S. PATENT DOCUMENTS

| | | | |
|---|---|---|---|
| 2,716,236 A | 8/1955 | Brooks et al. | |
| 3,068,473 A | 12/1962 | Muth | |
| 3,213,449 A | 10/1965 | Kobayashi et al. | |
| 3,461,452 A | 8/1969 | Welter | |
| 5,260,711 A | 11/1993 | Sterzer | |
| 5,343,499 A | 8/1994 | Jasper et al. | |
| 5,471,411 A * | 11/1995 | Adams et al. | 708/300 |
| 5,900,838 A | 5/1999 | Khan et al. | |
| 6,133,876 A | 10/2000 | Fullerton et al. | |
| 6,208,297 B1 | 3/2001 | Fattouche et al. | |
| 6,236,365 B1 * | 5/2001 | LeBlanc et al. | 342/457 |
| 6,252,546 B1 | 6/2001 | Lennen et al. | |
| 6,269,075 B1 | 7/2001 | Tran | |
| 6,285,319 B1 | 9/2001 | Rose | |
| 6,295,019 B1 | 9/2001 | Richards et al. | |
| 6,297,773 B1 | 10/2001 | Fullerton et al. | |
| 6,300,903 B1 | 10/2001 | Richards et al. | |
| 6,338,105 B1 | 1/2002 | Niizuma et al. | |
| 6,453,168 B1 | 9/2002 | McCrady et al. | |
| 6,483,461 B1 | 11/2002 | Matheney et al. | |
| 6,486,831 B1 | 11/2002 | Martorana et al. | |

(Continued)

OTHER PUBLICATIONS

Performance Limitations Of A Precision Indoor Positioning System Using A Multi-Carrier Approach—David Cyganski et al—Worcester Polytechnic Institute—ION NTM Jan. 2005—pp. 1093-1110.

(Continued)

*Primary Examiner*—Edward Urban
*Assistant Examiner*—April S Guzman
(74) *Attorney, Agent, or Firm*—Randi L. Karpinia (57) ABSTRACT

A method and system for determining the time of arrival of a direct radio signal. The system including a receiver (210) for receiving a plurality of signals, wherein each of the plurality of received signals has an associated time of arrival. The system further including a processor (215) adapted to compute a impulse response function of a received signal; decompose an impulse response function comprising the time of arrival for each of the plurality of received signals; and identify a smallest time of arrival from the decomposed impulse response function.

6 Claims, 9 Drawing Sheets

U.S. PATENT DOCUMENTS

| | | | |
|---|---|---|---|
| 6,522,644 | B2 | 2/2003 | Bergkvist |
| 6,529,568 | B1 | 3/2003 | Richards et al. |
| 6,556,615 | B1 | 4/2003 | Pon |
| 6,563,461 | B1* | 5/2003 | Elgersma et al. ............ 342/458 |
| 6,611,234 | B2 | 8/2003 | Fullerton et al. |
| 6,614,836 | B1 | 9/2003 | Halford et al. |
| 6,665,333 | B2* | 12/2003 | McCrady et al. ............ 375/147 |
| 6,952,181 | B2* | 10/2005 | Karr et al. .................... 342/457 |
| 7,095,813 | B2* | 8/2006 | Amerga et al. ............... 375/343 |
| 7,139,457 | B2* | 11/2006 | Guan et al. ................. 385/123 |
| 7,221,913 | B2* | 5/2007 | Golden et al. ............ 455/67.16 |
| 2002/0155845 | A1 | 10/2002 | Martoranan |
| 2003/0227895 | A1 | 12/2003 | Strutt et al. |
| 2006/0039287 | A1* | 2/2006 | Hasegawa et al. ........... 370/238 |
| 2006/0050625 | A1* | 3/2006 | Krasner ...................... 370/208 |

OTHER PUBLICATIONS

Error Analysis Of A Precision Indoor Positioning System—David Cyganski et al—Worcester Polytechnic Institute—ION 60$^{th}$ Annual Meeting Jun. 2004—pp. 180-187.

Performance Of A Precision Indoor Positioning System Using A Multi-Carrier Approach—David Cyganski et al—Worcester Polytechnic Institute—ION NTM Jan. 2004—pp. 175-180.

A Multi-Carrier Technique For precision Geolocation For Indoor/Multipath Environments—David Cyganski et al—Worcester Polytechnic Institute—ION GPS/GNSS Sep. 2003—pp. 1069-1073.

Impact Of Multipath and Cross-Correlation On GPS Acquisition In Indoor Environments—Hanaa A. El-Natour et al—Ecole Nationale de l'Aviation Civile (ENAC), France—ION NTM Jan. 2005—pp. 1062-1070.

Ranging In a Dense Multipath Environment Using an UWB Radio Link—Joon-Yong Lee et al—IEEE 2002—pp. 1677-1683.

* cited by examiner (PRIOR ART)
*FIG. 1*

METHOD AND SYSTEM FOR DETERMINING THE TIME OF ARRIVAL OF A DIRECT RADIO SIGNAL

FIELD OF THE INVENTION

The present invention relates generally to wireless networks and more particularly to the measurement of time of arrival of radio signals in wireless networks.

BACKGROUND

The Time Of Arrival (TOA) of radio signals is used by many applications running on wireless networks for synchronizing the network clocks, for measuring the distance between two terminals or for computing positions. The accuracy of position services (i.e. Geographic, Geocentric or Relative positioning) depends on the accuracy of the measurement of Time Of Arrival. From TOA can be deducted the Time Of Flight (TOF), the Time Difference Of Arrival (TDOA), the clock shift and other time related entities that can be used in specific algorithms for computing the position of an object in relation with others or for synchronizing clocks.

Radio signals travel from the transmitter to receiver on one direct path and on several indirect paths. Indirect paths are caused by reflections, refractions and scattering (diffusion) of radio signals. Reflections are caused by radio waves bouncing on flat surfaces like vertical walls, horizontal concrete or asphalt covered surfaces, horizontal body of water, etc. Refractions are changes of the direction of propagation path when the signal travels through anisotropic media. Variations in air temperature, humidity and density cause the phenomenon known as the atmospheric refraction that makes the electromagnetic radiation to follow a curve path. For some terrestrial applications when the relative distances between the transmitter and receiver are small, the effect of reflection of the direct path is smaller that it can be measured therefore it can be ignored. Scattering of radio signals happens when signals travel through objects smaller than the wavelength of the electromagnetic signal, like edges of metallic furniture, edges of buildings, top of mountains, etc.

Indirect signals arrive at receiver later than the direct signal, because their paths are longer than the direct path.

TOA of radio signals can be measured by transmitting an analog impulse or by transmitting a numerical sequence of pseudo-random bits that are used for computing the impulse response.

The analog method of transmitting one radio impulse has the advantage of providing a very clear "view" of the direct and reflected signals, allowing the identification of the time of arrival of each of them with a precision as good as the length of the impulse. The disadvantage of the method consists on the fact that the duration of the impulse is too short to have enough energy for propagating very far. In order to propagate the impulse at practical distances, it is necessary to use very high transmit power. Because the impulse duration is very short, the energy spectrum of the impulse signal is very large, interfering with communications over a large frequency spectrum. This fact restricts the use of analog impulses for measuring practical distances.

The digital method of impulse-response consists in transmitting a sequence of pseudo-random bits (pn). Gold codes are the most used pn sequence because they offer a good autocorrelation. As they arrive at receiver, the bits of the pn sequence are stored in a shifting a register that is cross-correlated with the same pn sequence as the one used at transmitter. When all, or almost all received bits match the witness pn sequence, the cross-correlation function has a significant peak and the TOA is computed as the difference between the content of the clock register at that moment and the time needed for transmitting the pn sequence. The method requires very small energy for transmitting the signal at very large distances and offers precision as good as the clock tick. Mathematical methods for computing the TOA with higher precision than one clock tick are presented, for example, in United States patent application number 20030227895 to Strutt et al. entitled "System and method for improving the accuracy of time of arrival measurements in a wireless ad-hoc communications network" and U.S. Pat. No. 6,269,075 to Tran entitled "Finger assignment in a CDMA rake receiver", both of which contents are incorporated by reference herein.

The disadvantage of the method using the pn sequence consists in the difficulty of separating between the TOA of the direct path and the TOA of reflected paths, when the length of the reflected paths is very close to the length of the direct path. Because the clocks of transmitter and receiver do not tick in the same time, each bit of the pn sequence has to be transmitted for at least two clock ticks, or the receiver should sample the signal twice as fast as it is transmitted. It makes sure that a complete received bit matches one bit of the pn witness sequence, not only a fraction of it. At a 32 MHz (Megahertz) clock frequency, each bit is transmitted during two clock ticks, or 62.5 ns (nanoseconds). Therefore, if the direct and one reflected path have a difference of length smaller than 20 m (meters), they cannot be easily identified with the impulse-response method because the time passed between receiving the direct signal and receiving the indirect signal is less than 60 ns. The problem becomes even more difficult, if a large number of reflected signals arrive over a long period (hundreds of ns) of time, but at close interval one to another. Such response is characteristic to reflections on very rough surfaces.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to measuring the time of arrival of a direct signal. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of measuring the time of arrival of a direct signal described herein. The non-processor circuits may include, but are not limited to, a radio receiver, a radio transmitter, signal drivers, clock circuits, power source circuits, and user input devices. As such, these functions may be interpreted as steps of a method to perform measuring the time of arrival of a direct signal. Alternatively, some or all functions could be implemented by a state machine in one or more application specific integrated circuits (ASICs), that has no stored program instructions, in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention provides a method that allows the separation of the time of arrival of the direct and indirect signals with a theoretical error of zero seconds. In practice, the precision of the path separation depends on the size of errors affecting the impulse-response values.

Figure 1:
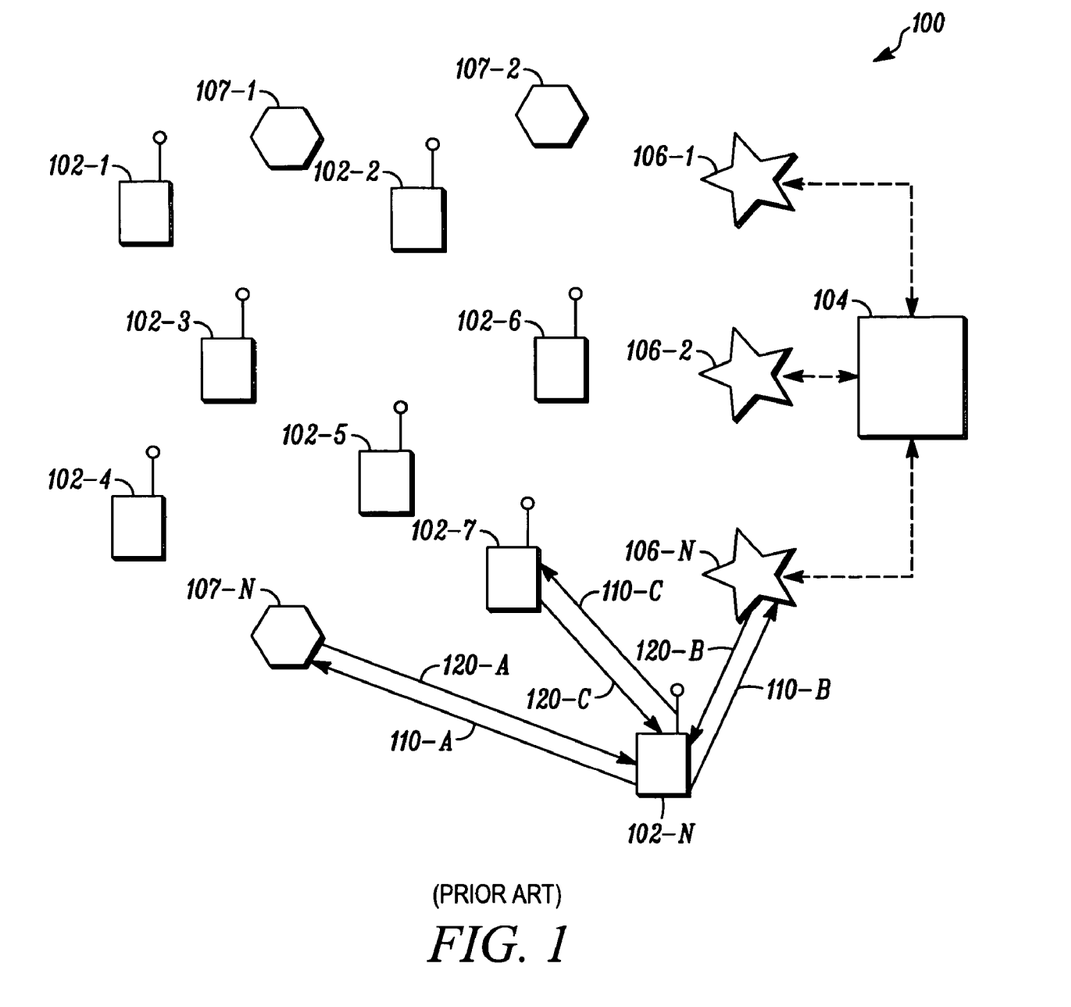
FIG. 1 is a block diagram of an example communication network employing a system and method in accordance with an embodiment of the present invention.

FIG. 1 is a block diagram illustrating an example of a communication network 100 employing an embodiment of the present invention. For illustration purposes, the communication network 100 comprises an adhoc wireless communications network. For example, the adhoc wireless communications network can be a mesh enabled architecture (MEA) network or an 802.11 network (i.e. 802.11a, 802.11b, or 802.11g) It will be appreciated by those of ordinary skill in the art that the communication network 100 in accordance with the present invention can alternatively comprise any packetized communication network. For example, the communication network 100 can be a network utilizing packet data protocols such as TDMA (time division multiple access), GPRS (General Packet Radio Service) and EGPRS (Enhanced GPRS).

As illustrated in FIG. 1, the communication network 100 includes a plurality of mobile nodes 102-1 through 102-n (referred to generally as nodes 102 or mobile nodes 102 or mobile communication devices 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, a public switched telephone network (PSTN) and the Internet. The communication network 100 further can include a plurality of fixed routers 107-1 through 107-n (referred to generally as nodes 107 or fixed routers 107 or fixed communication devices 107) for routing data packets between other nodes 102, 106 or 107. It is noted that for purposes of this discussion, the nodes discussed above can be collectively referred to as "nodes 102, 106 and 107", or simply "nodes" or alternatively as "communication devices."

As can be appreciated by one skilled in the art, the nodes 102, 106 and 107 are capable of communicating with each other directly, or via one or more other nodes 102, 106 or 107 operating as a router or routers for packets being sent between nodes. As illustrated in FIG. 1, each node communicates with other neighboring nodes using a transmitting link and a receiving link associated with the node and each of the neighboring nodes. For example, node 102-N, as illustrated, communicates with node 107-N using a transmitting link 110-A and a receiving link 120-A, communicates with node 106-N using a transmitting link 110-B and a receiving link 120-B, and communicates with node 102-7 using a transmitting link 110-C and a receiving link 120-C. Associated with each communication link (i.e. each transmitting link 110 and each receiving link 120) are Time of Arrival data for various signals being communicated.

Figure 2:
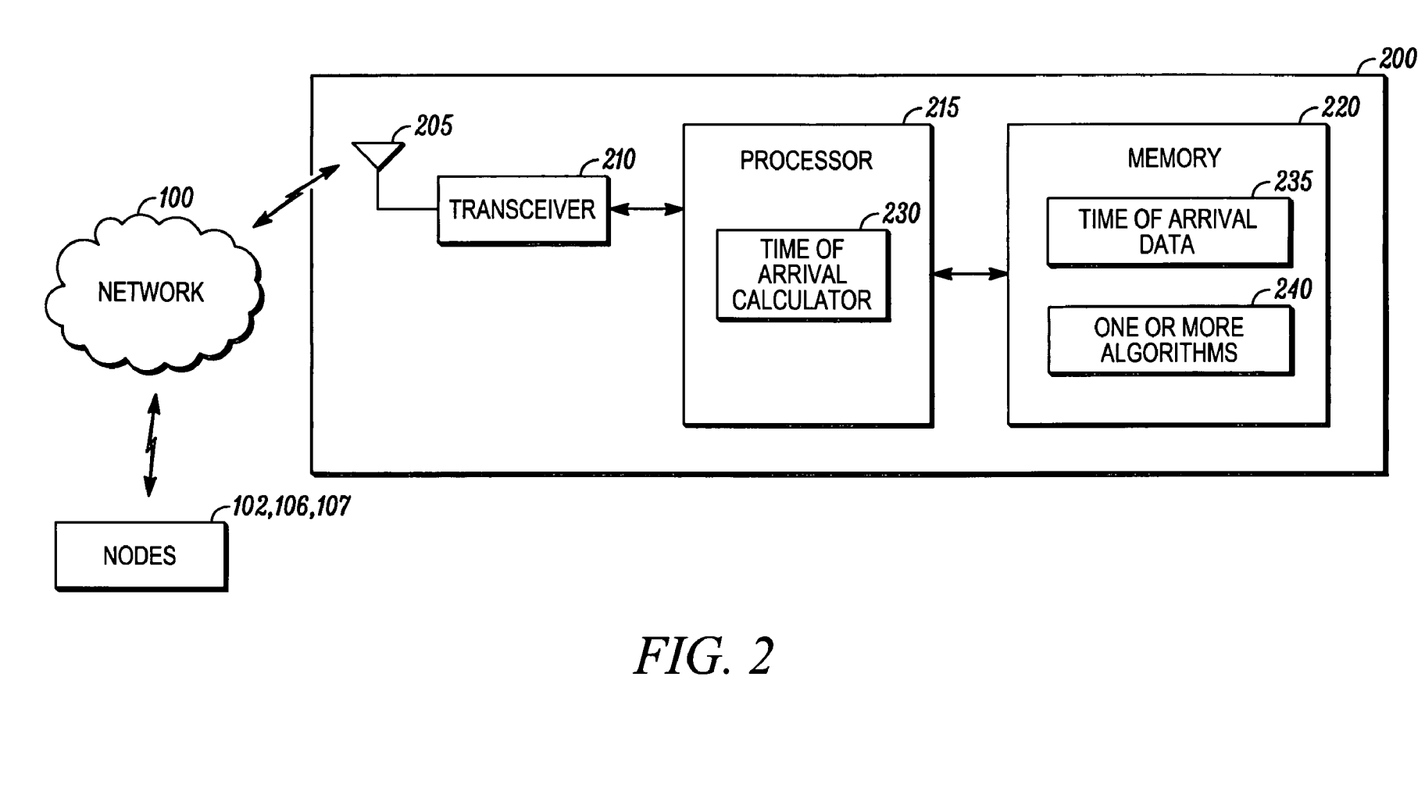
FIG. 2 is a block diagram illustrating an example of a communication device employed in the communication network shown in FIG. 1 in accordance with an embodiment of the present invention.

FIG. 2 is an electronic block diagram of one embodiment of a communication device 200 in accordance with the present invention. The communication device 200, for example, can exemplify one or more of the nodes 102, 106, and 107 of FIG. 1. As illustrated, the communication device 200 includes an antenna 205, a transceiver (or modem) 210, a processor 215, and a memory 220.

The antenna 205 intercepts transmitted signals from one or more nodes 102, 106, 107 within the communication network 100 and transmits signals to the one or more nodes 102, 106, 107 within the communication network 100. The antenna 205 is coupled to the transceiver 210, which employs conventional demodulation techniques for receiving and transmitting communication signals, such as packetized signals, to and from the communication device 200 under the control of the processor 215. The packetized data signals can include, for example, voice, data or multimedia information, and packetized control signals, including node update information. When the transceiver 210 receives a command from the processor 215, the transceiver 210 sends a signal via the antenna 205 to one or more devices within the communication network 100. In an alternative embodiment (not shown), the communication device 200 includes a receive antenna and a receiver for receiving signals from the communication network 100 and a transmit antenna and a transmitter for transmitting signals to the communication network 100. It will be appreciated by one of ordinary skill in the art that other similar electronic block diagrams of the same or alternate type can be utilized for the communication device 200.

Coupled to the transceiver 210, is the processor 215 utilizing conventional signal-processing techniques for processing received messages. It will be appreciated by one of ordinary skill in the art that additional processors can be utilized as required to handle the processing requirements of the processor 215.

In accordance with the present invention, the processor 215 includes a time of arrival calculator 230 for determining a time of arrival of a direct radio signal communicated with the communication device 200 within the communication network 100. It will be appreciated by those of ordinary skill in the art that the time of arrival calculator 230 can be hard coded or programmed into the communication device 200 during manufacturing, can be programmed over-the-air upon customer subscription, or can be a downloadable application. It will be appreciated that other programming methods can be utilized for programming the time of arrival calculator 230 into the communication device 200. It will be further appreciated by one of ordinary skill in the art that the time of arrival calculator 230 can be hardware circuitry within the communication device 200. In accordance with the present invention, the time of arrival calculator 230 can be contained within the processor 215 as illustrated, or alternatively can be an individual block operatively coupled to the processor 215 (not shown).

The time of arrival calculator 230, in accordance with the present invention, is adapted to decompose an impulse response function, wherein the impulse response function comprises a time of arrival for each of a plurality of received signals; and identify a smallest time of arrival from the decomposed impulse response function.

To perform the necessary functions of the communication device 200, the processor 215 is coupled to the memory 220, which preferably includes a random access memory (RAM), a read-only memory (ROM), an electrically erasable programmable read-only memory (EEPROM), and flash memory. The memory 220, in accordance with the present invention, includes storage locations for the storage of one or more time of arrival data 235, one or more operational algorithms 240 such as a decomposition algorithm, an impulse response function algorithm, and the like.

It will be appreciated by those of ordinary skill in the art that the memory 220 can be integrated within the communication device 200, or alternatively, can be at least partially contained within an external memory such as a memory storage device. The memory storage device, for example, can be a subscriber identification module (SIM) card. A SIM card is an electronic device typically including a microprocessor unit and a memory suitable for encapsulating within a small flexible plastic card. The SIM card additionally includes some form of interface for communicating with the communication device 200.

Figure 3:
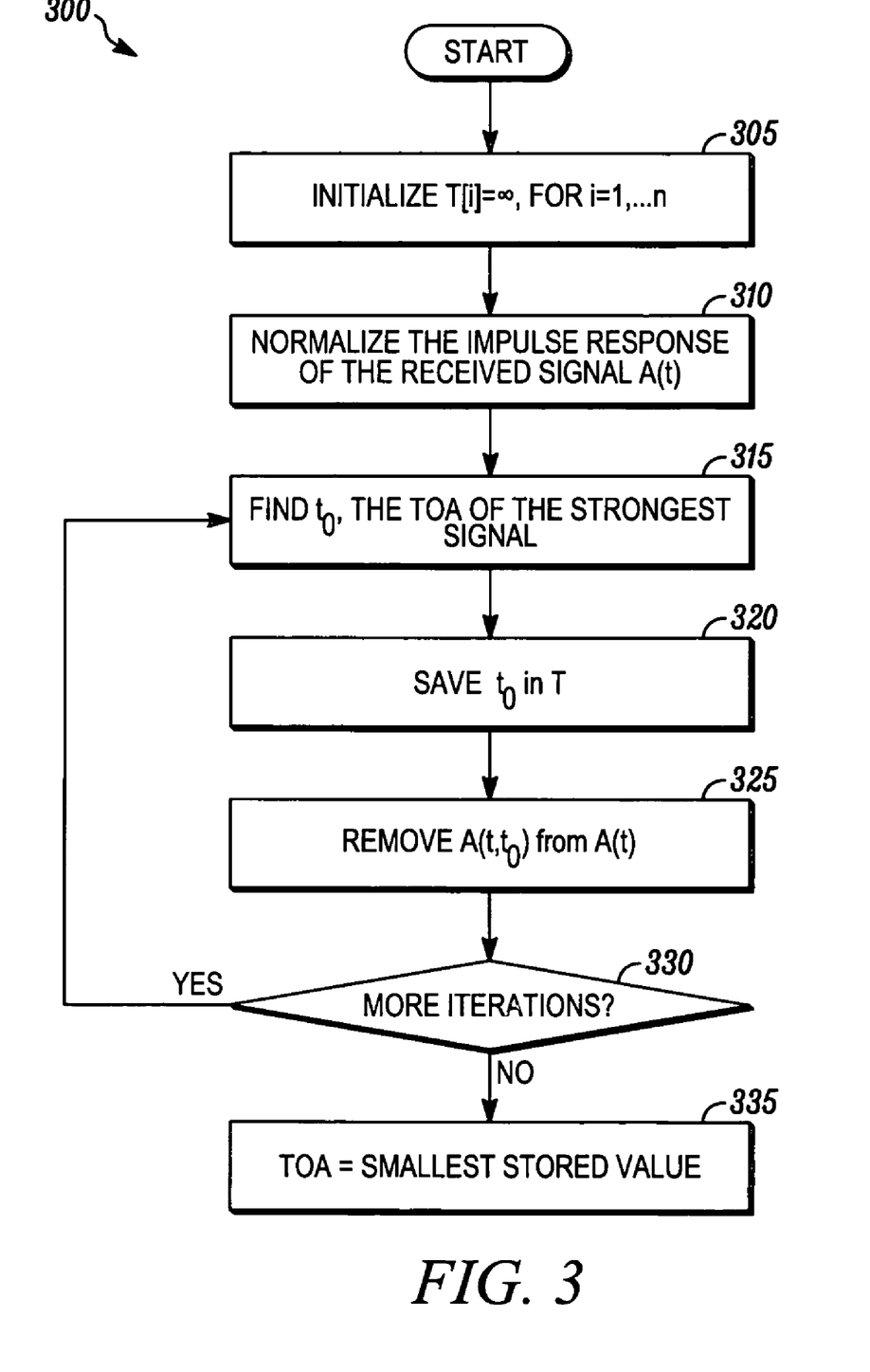
FIGS. 3 and 4 are flowcharts illustrating an operation of the communication device of FIG. 2 in accordance with one embodiment of the present invention.

FIG. 3 is a flowchart illustrating an operation 300 of the time of arrival calculator 230 in accordance with one embodiment of the present invention. As illustrated, the operation begins with Step 305 in which an array T is first initialized to very large values symbolizing infinity for processors 215 operating with finite number of digits. Next, in Step 310, an impulse response function is normalized. Next, in Step 315, the time of arrival (TOA) of the strongest signal is identified. Next, in Step 320, the time of arrival of the strongest signal is stored. Next, in Step 325, the impulse response of the strongest signal from the impulse response of the received signal is eliminated. In other words, the impulse response associated to the TOA $t_0$ is removed from the impulse response of the received signal by computing $V=V-A(t, t_0)+V_0$. Next, in Step 330, it is determined whether more iterations are desired/required. When no more iterations are required/desired, the operation continues to Step 335, in which the time of arrival of the direct radio signal is determined to be the smallest value of the stored time of arrivals. When more iterations are required/desired, the operation cycles back to Step 315. A large number of iterations can then be performed. The number of iterations, for example, can be a predetermined number of iterations stored in the memory 220 or programmed into the time of arrival calculator 230 or can be dynamically chosen with a method analyzing the statistical distribution of identified TOA values or with another method (at random between some values, for example).

As an example, the operation described in FIG. 3 can include collecting a predetermined number of values of an impulse response function, with the maximum value of the function being included in the set; normalizing the data set of collected values and store the normalized values in vector $V_0$; setting a set $V=V_0$; initializing a vector T with very large values as the approximated time of arrival; running a decomposition algorithm a predetermined number of times; replacing the largest value of vector T with the time of arrival ($t_0$) resulting from the decomposition algorithm; repeating the running and replacing steps for a number of times; and identifying the smallest value of T as the earliest time of arrival.

Figure 4:
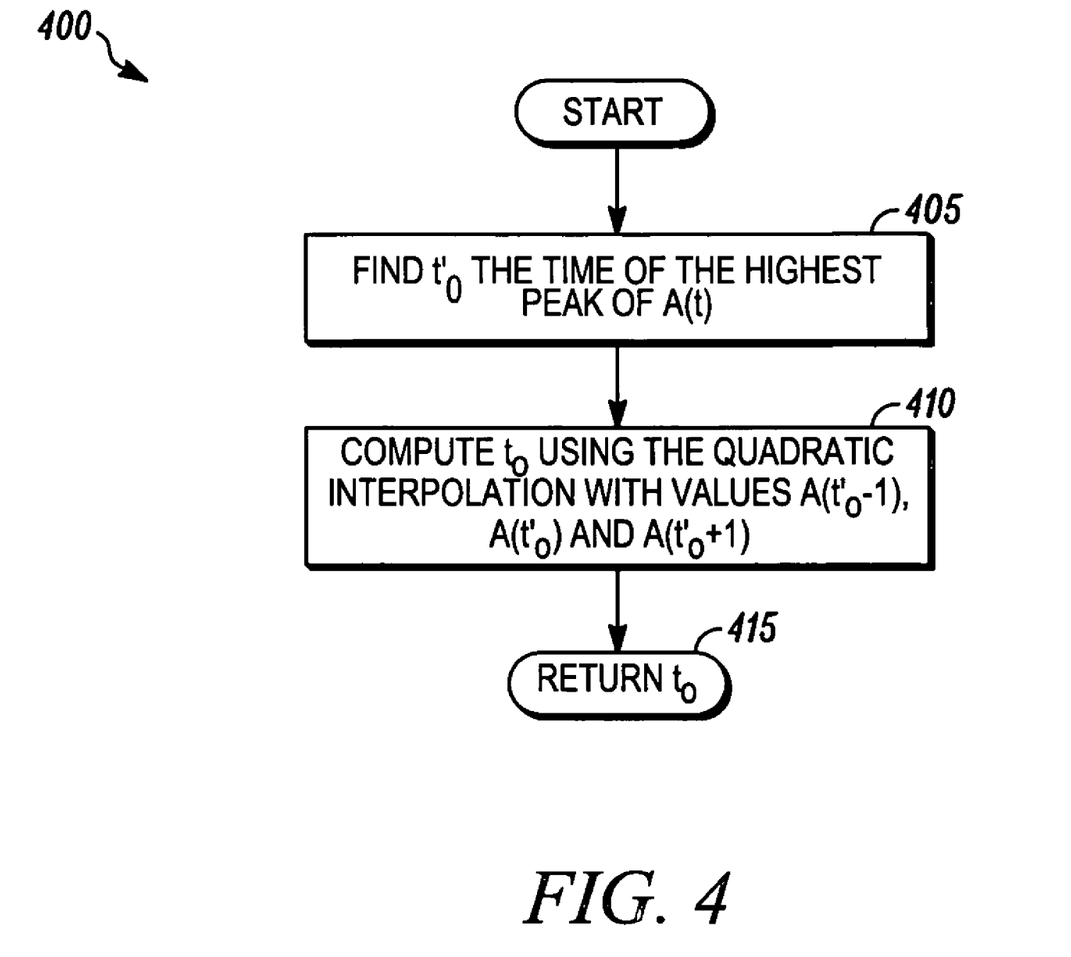

FIG. 4 is a flowchart illustrating further detail of the operation 400 of the time of arrival calculator 230. Specifically, FIG. 4 illustrates the process of identifying the time of arrival of a path with high energy $t_0$ from the maximum value of the received signal impulse response and previous and following values of the impulse response. As illustrated, the operation begins with Step 405 in which the approximated TOA $t'_0$ of the highest peak of the impulse response function is determined. Next in Step 410, quadratic interpolation is used to identify a correct TOA associated with a peak in the impulse response function. Next, in Step 415, the correct TOA value $t_o$ is returned.

As an example, the operation described in FIG. 4 can include using quadratic interpolation to find the time of arrival ($t_i$) associated with the peak of the impulse response function for a set V. Although the quadratic interpolation is the preferred method for computing the correct time of arrival of the strongest signal, it will be appreciated by those of ordinary skill in the art that other methods can be used as well.

Figure 5:
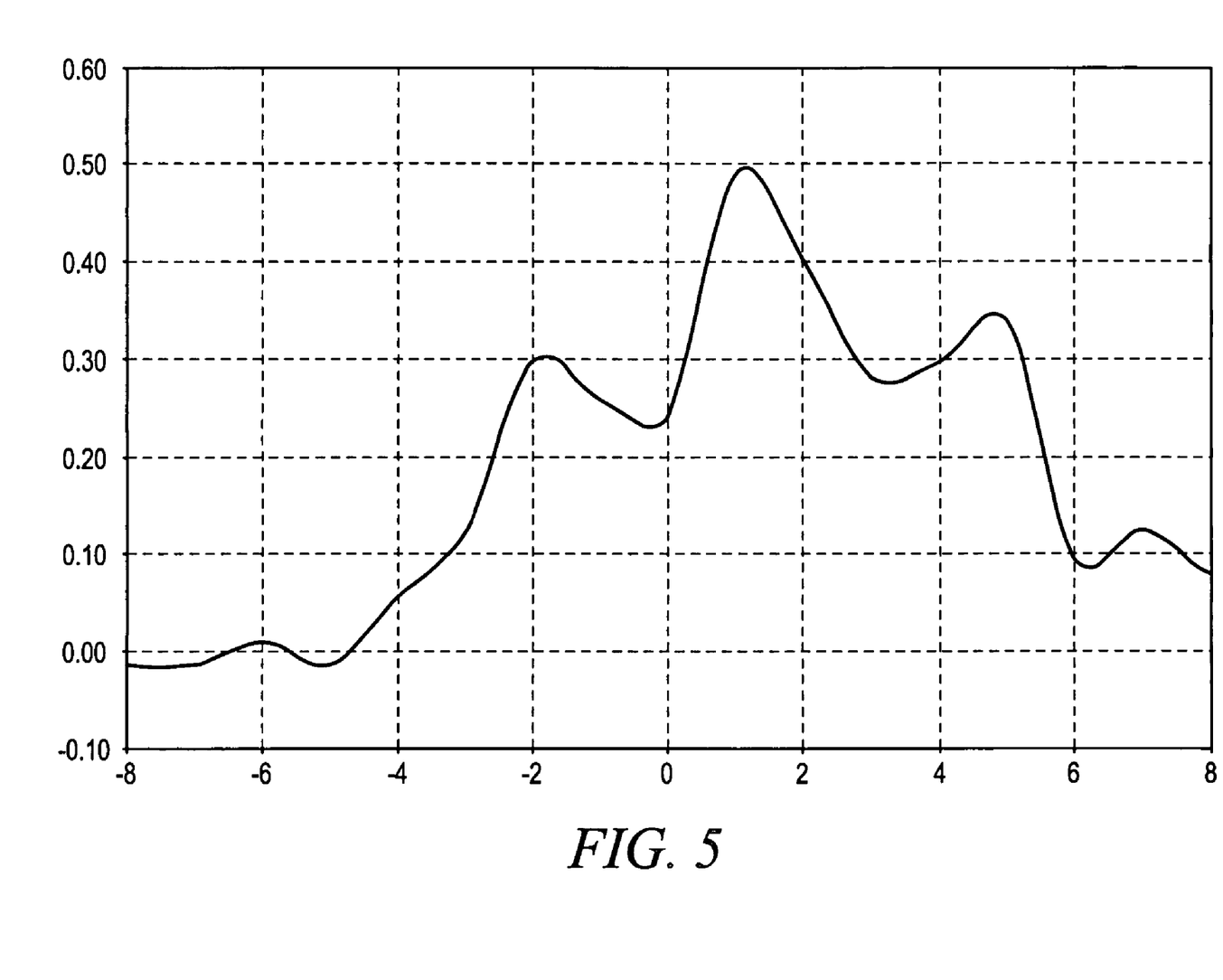
FIGS. 5 through 9 are various functional charts associated with the operation of the present invention.
Figure 6:
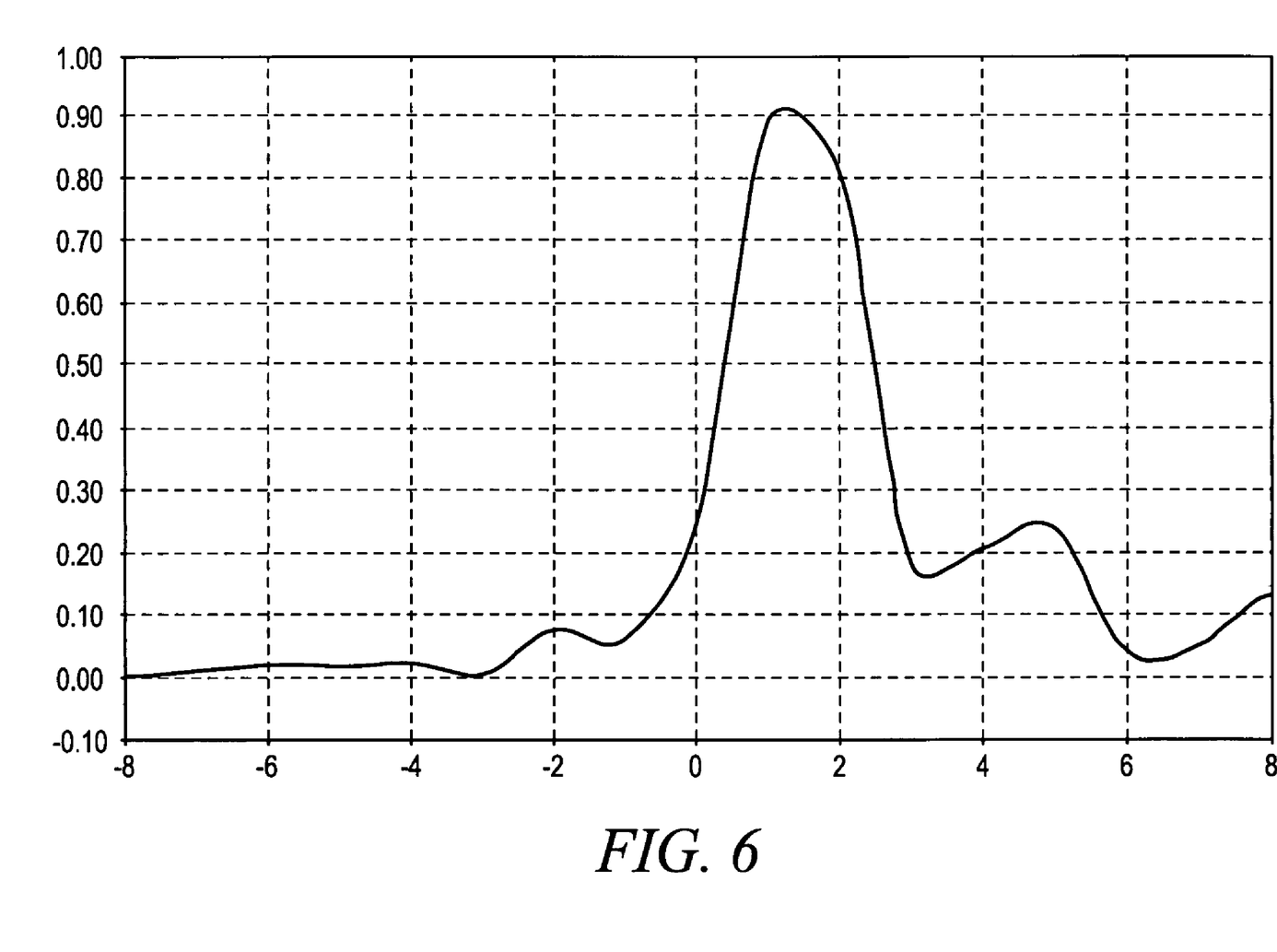
Figure 7:
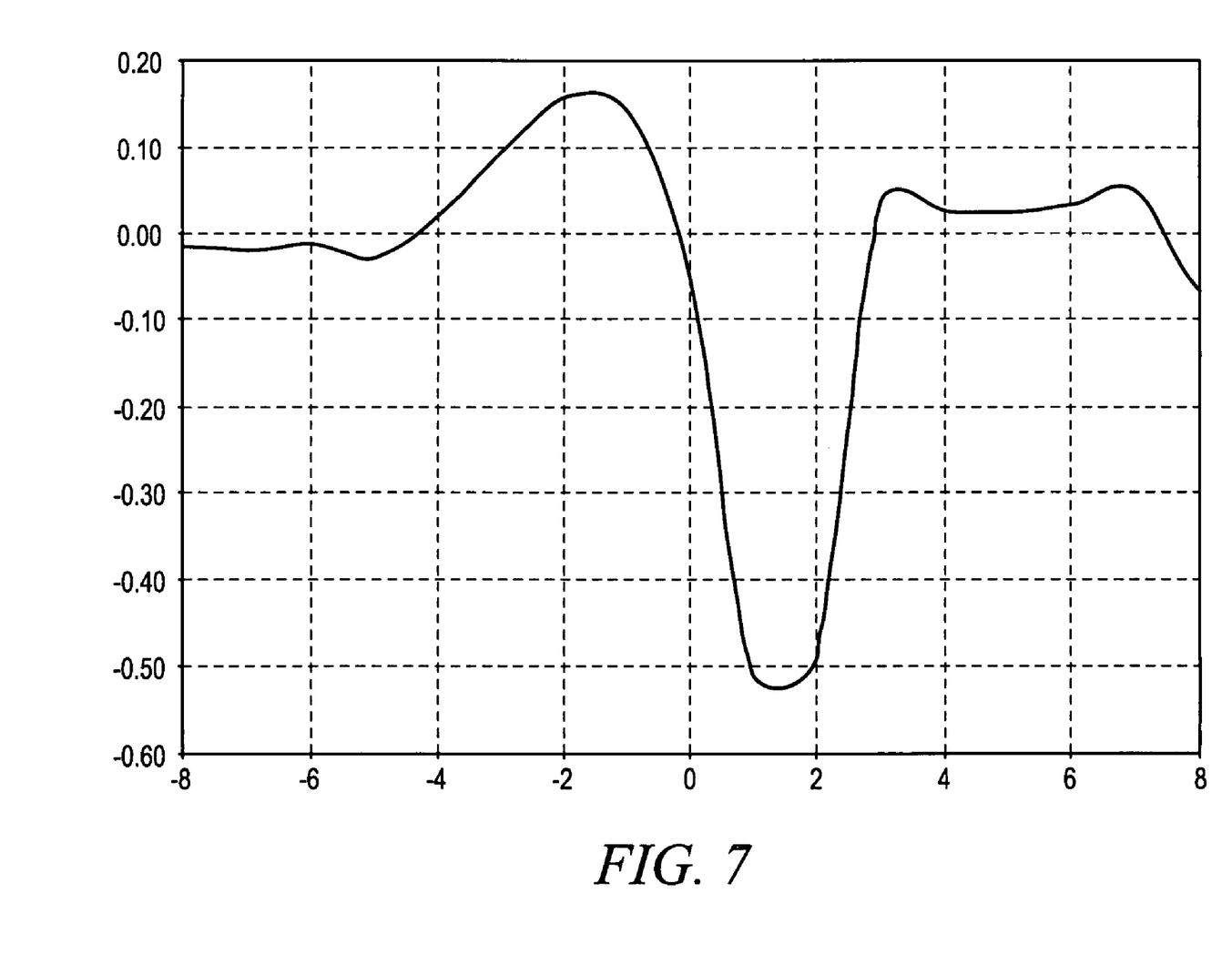
Figure 8:
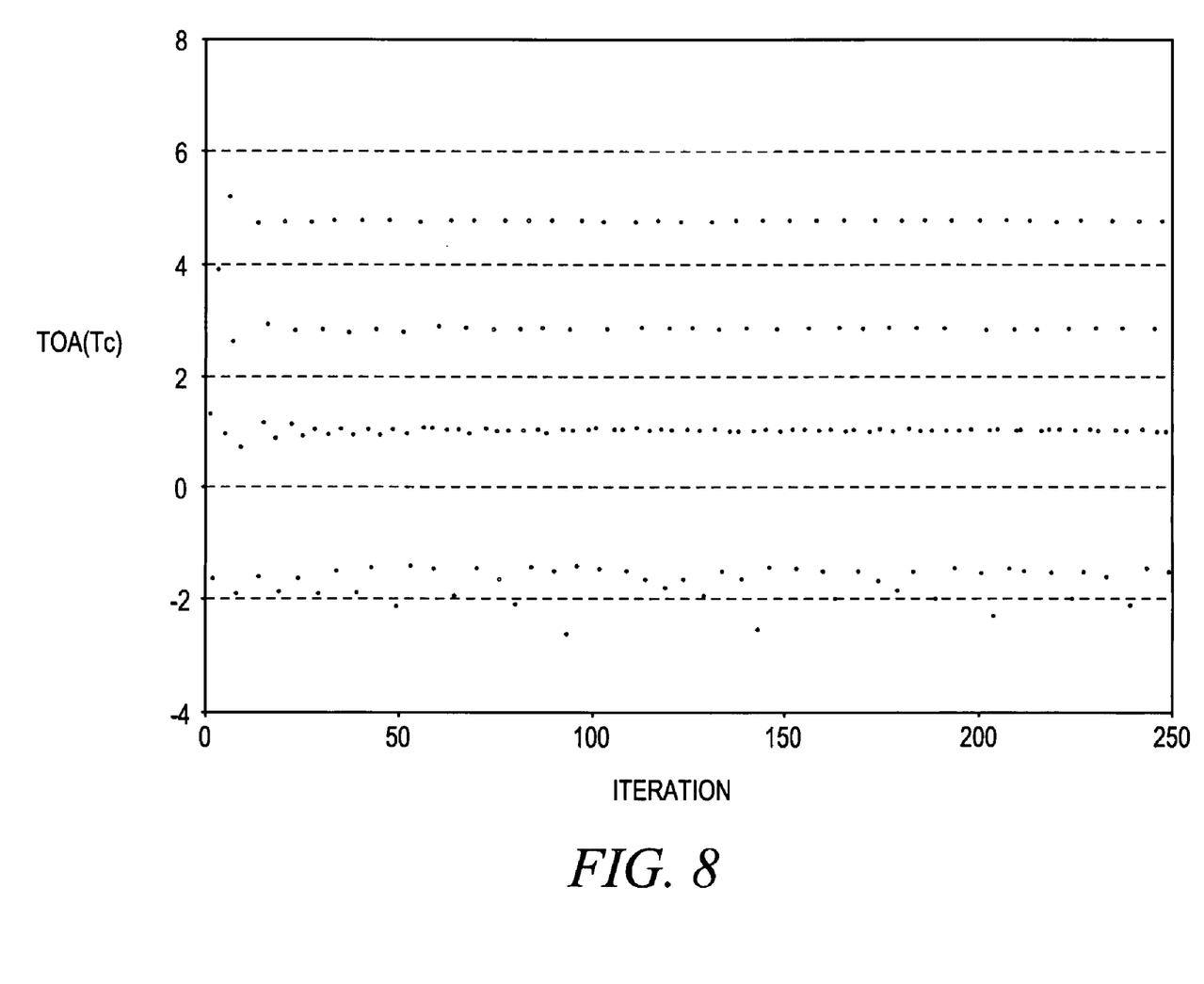

FIGS. 5 through 8 illustrate the signals associated with the operation described herein. In all these charts, the time is measured in clock ticks ($T_c$). FIG. 5 illustrates an example of the impulse response function associated with a received signal. FIG. 6 illustrates an elementary impulse response (single path signal) that has the TOA equal with the highest peak of the impulse response presented in FIG. 5. FIG. 7 illustrates the difference between the impulse response function of the received signal and the elementary function with the same TOA as the signal carrying the highest energy. FIG. 8 illustrates a chart showing all TOA measured in 250 successive iterations when decomposing the received signal presented in FIG. 7. It will be appreciated by those of ordinary skill in the art that after several iterations, the process becomes very stable providing consistent values of TOA for the four paths.

More detail of the theory of the present invention follows herein.

Figure 9:
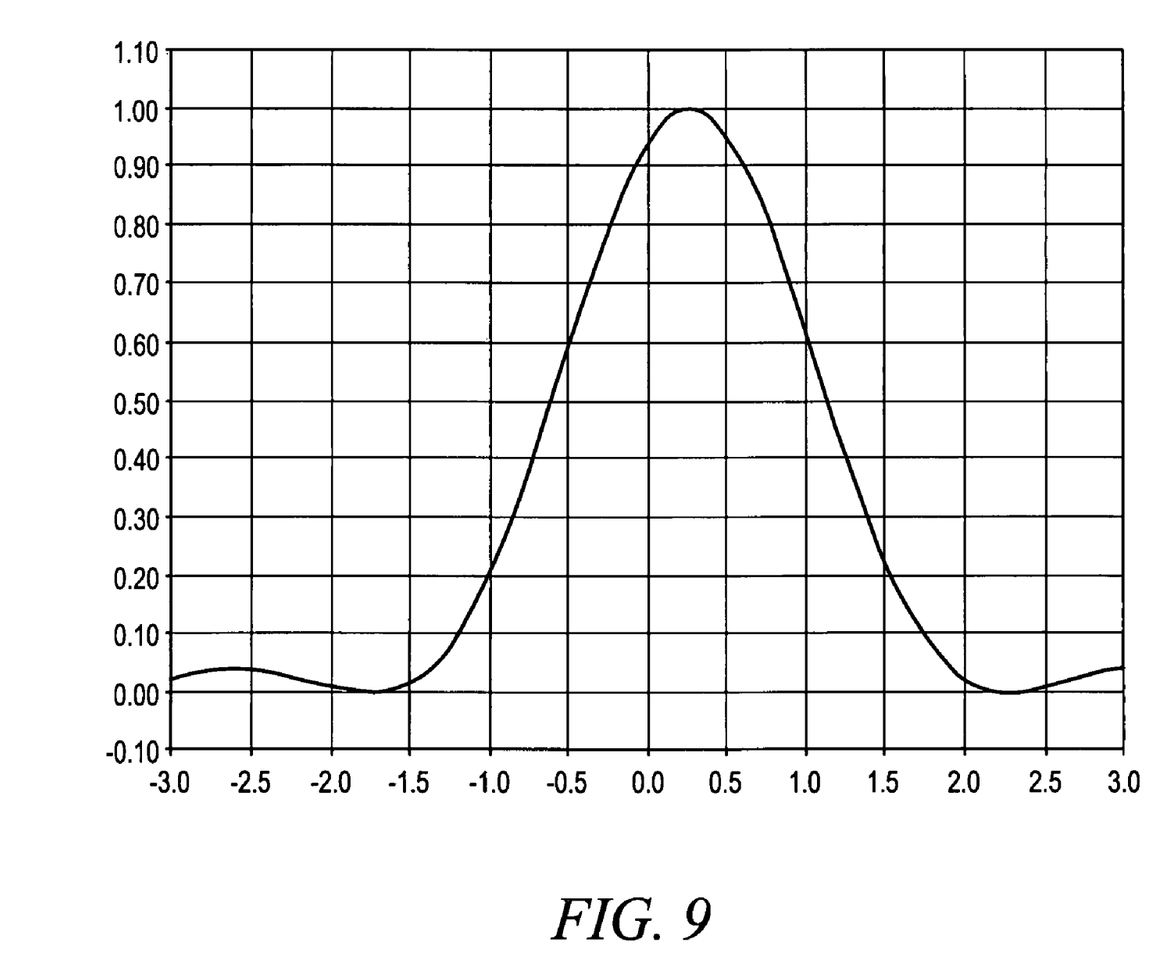

FIG. 9 illustrates the theoretical variation in time of an impulse response function. It is generated with an ideal pn code of {+1, −1} values.

$$\left| \sum_{i=0}^{n-1} pn_i * pn_{(i+k)n} \right| = n\delta_k^0 + \varepsilon; k = 0, 1, 2, \ldots, n-1 \quad \text{Equation 1}$$

$$\left| \sum_{i=0}^{m} pn_i \right| = \varepsilon; m = 0, 1, 2, \ldots, n-1$$

In the first line of Equation 1 the symbol "|" is used for marking the absolute value operation and $\delta_k^0$ is one when k=0 and zero otherwise. The value $\varepsilon$ is some positive number much smaller than n.

As mentioned, each symbol is transmitted (and received) during two successive clock ticks.

$$A(t, t_0) = \frac{1}{2T} \left| \int_0^{2T} pn(\tau - t) pn(\tau - t_0) d\tau \right| \quad \text{Equation 2}$$

The function $A(t, t_0)$ from Equation 2 provides the measure of the probability of matching the predefined pn pattern. The $t_0$ parameter is the time of arrival of the signal, or the moment when the received set of bits matches exactly the witness pn sequence. In other words, $A(t_0, t_0)=1$. The case presented in FIG. 9 has $t_0=0.25$.

The $A(t,t_0)$ function is continuous and positive defined for $t \in \mathcal{R}$ with zero values at infinity. When t is equal with the time of arrival $t_0$, the function value is at maximum and equal to one. Changes of the distance between the receiver and the transmitter have the effect of sliding the function left or right. Because the $A(t,t_0)$ function is positive, has zero values at infinity and the parameter $t_0$ is additive to the independent variable t, the value of function integral on t over $\mathcal{R}$ is not dependent on t0, therefore it is constant. The value of the integral of the theoretical impulse response function presented in FIG. 9 from −∞ to +∞ is 1.8845, regardless of the value of the time of arrival $t_0$.

$$C(t_0) = \int_{-\infty}^{+\infty} A(t, t_0) dt = 1.8845 \quad \text{Equation 3}$$

The chart in FIG. 6 illustrates the real life impulse response. The shape of the function is affected by packaging of RF elements and antenna characteristics. The values for computing the impulse response presented in FIG. 6 have been collected connecting the receiver and transmitter with a 5.41 m coaxial cable and using 70 dB of attenuation. The value of the integral of the real-life impulse response function is 3.941. It is expected that for various packaging and antenna types, the value of the function integral in Equation 3 to change.

In the set of n signals arriving at receiver on different paths, each one generates a specific impulse response $A(t, t_i)$, i=1, 2, ... n, where $t_i$ is the TOA of each signal. The fact that the integral of the direct signal is the same as the integral of the multipath signal, suggests that the impulse response function is the linear combination of all $A(t, t_i)$ functions. The conclusion comes from the fact that the integration process is an additive operation.

$$\begin{aligned} R &= \int_{-\infty}^{+\infty} \sum_{i=1}^{n} a_i A(t, t_i) dt \\ &= \sum_{i=1}^{n} a_i \int_{-\infty}^{+\infty} A(t, t_i) dt \\ &= 3.941 \sum_{i=1}^{n} a_i \end{aligned} \quad \text{Equation 4}$$

Equation 4 shows that impulse response of signals arriving on each path enters in the combination with a particular weight, but the sum of all weights must be constant for assuring the same integral for any combination of indirect signals. The $a_i$ coefficients are a set of constant values each associated to one of the n paths followed by the direct and indirect signals. Because the $a_i$ coefficients are weights, they should be positive $a_i > 0$, for i=1, 2, ... n. The fact that R is a constant number implies that $$\sum_{i=1}^{n} a_i$$

is also constant. In the case when only the direct signal is received, the value of $a_1=1$. Therefore the value of the summation of all $a_i$ must be one $$\sum_{i=1}^{n} a_i = 1.$$

The response impulse function $\mathcal{A}(t, \{t_1, t_2, \ldots t_n\})$ of a signal arriving on n paths is defined as:

$$\mathcal{A}(t, \{t_1, t_2, \ldots t_n\}) = C \sum_{i=1}^{n} a_i A(t, t_i) \text{ where } \sum_{i=1}^{n} a_i = 1 \quad \text{Equation 5}$$

In Equation 5, the set $\{t_1, t_2, \ldots t_n\}$ indicate the time of arrival of each path while $A(t,t_i)$ are the impulse response functions associated to each path. As defined, the $\mathcal{A}(t, \{t_1, t_2, \ldots t_n\})$ is the set of values of the impulse response function of all paths, therefore is the one that is measured. The set of coefficients have the sum equal to one and they are all positive. The constant C provides the normalization of the collected values.

The chart in FIG. 5 shows the impulse response function of a particular sample. The window considered in this case has 61 positions, from −8 to +8 $T_c$. At each clock tick, the "curve" moves from right to left with one position. It means that the values on the left are older than values on the right. When the maximum value of the impulse response function is in the middle of the window, the TOA is computed from the content of the clock minus the duration of the transmission of the pn sequence. The TOA so computed is only approximate and further corrections should be applied. From this chart can be seen that the signal was received on at least four different paths (we can consider as noise all values smaller than 0.1) the first two separated with almost 3 ticks, a third after almost 4 ticks and on a forth path 2 ticks later. The second path has the highest peak, which means that on this path are received the largest number of correct bits.

From what we discussed up to this point, if the received signal comes on only one path, we have:

$$\mathcal{A}(t, \{t_1\}) = A(t,t_1) \qquad \text{Equation 6}$$

Although the weighting factors $a_i$ in Equation 5 could be different one from another, we will consider that they all have the same value. It does not affect the generality of the fact that $a_i$ could have different values, because each weighted average can be expressed as an average of data in the weighted group. For example, if one signal arrives on three paths with weights 0.2, 0.3 and 0.5 (the sum must be one) at time TOA1, TOA2, and TOA3, we can consider that we have 10 incoming signals with equal weight 0.1, where two signals arrive at the same TOA1, three signals arrive at TOA2 and five signals arrive simultaneously at TOA3.

If all $a_i$ are equal, each one has the value:

$$a_i = \frac{1}{n} \text{ for } i = 1, 2, \ldots, n \qquad \text{Equation 7}$$

With this naming convention, we can say that the impulse response function can be written as the average of the impulse response functions associated to each of the incoming signals, where n is a very large number and at each time of arrival $t_i$ arrives one or more signals:

$$\mathcal{A}(t, \{t_1, t_2, \ldots t_n\}) = \frac{\sum_{i=1}^{n} A(t, t_i)}{n} \qquad \text{Equation 8}$$

Since the signals arrive on much less than n paths, if n is very large, it is evident that some elements of the $\{t_1, t_2, \ldots, t_n\}$ must have the same value. We do not know a priory the number n of incoming paths, so the real situation is one and only one of the following equations:

$$\mathcal{A}(t, \{t_1\}) = A(t,t_1)$$

$$2\mathcal{A}(t, \{t_1, t_2\}) = A(t,t_1) + A(t,t_2)$$

$$3\mathcal{A}(t, \{t_1, t_2, t_3\}) = A(t,t_1) + A(t,t_2) + A(t,t_3)$$

$$\ldots$$

$$n\mathcal{A}(t, \{t_1, \ldots, t_n\}) = A(t,t_1) + \ldots + A(t,t_n) \qquad \text{Equation 9}$$

We can deduct now an iterative approach for finding all the paths followed by the received signals. Let suppose that n is the correct number of received signals (on direct and indirect paths), therefore only the last equation in the previous set is verified as equality.

We define $\mathcal{D}(t, \{t_m, \ldots, t_n\})$ as the difference $m\mathcal{A}(t, \{t_1, \ldots, t_n\}) - (A(t,t_1) + \ldots + A(t,t_m))$.

Because only the last line of Equation 9 is verified, all other lines will have residuals different than zero if the right hand terms are subtracted from the left hand terms.

$$\mathcal{D}(t, \{t_2, \ldots, t_n\}) = \mathcal{A}(t, \{t_1, \ldots, t_n\}) - A(t,t_1)$$

$$\mathcal{D}(t, \{t_3, \ldots, t_n\}) = \mathcal{D}(t, \{t_2, \ldots, t_n\}) + \mathcal{A}(t, \{t_1, \ldots, t_n\}) - A(t,t_2)$$

$$\mathcal{D}(t, \{t_4, \ldots, t_n\}) = \mathcal{D}(t, \{t_3, \ldots, t_n\}) + \mathcal{A}(t, \{t_1, \ldots, t_n\}) - A(t,t_3)$$

$$\ldots$$

$$\mathcal{D}(t, \{t_k, \ldots, t_n\}) = \mathcal{D}(t, \{t_2, \ldots, t_{k-1}\}) + \mathcal{A}(t, \{t_1, \ldots, t_n\}) - A(t,t_k)$$

$$\ldots$$

$$0 = \mathcal{D}(t, \{t_n\}) + \mathcal{A}(t, \{t_1, \ldots, t_n\}) - A(t,t_n) \qquad \text{Equation 10}$$

If we add all lines in Equation 10, we get exactly the last line from Equation 9, which we supposed that is verified as equality.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method for determining a time of arrival of a direct radio signal within a wireless communication network comprising:
    decomposing an impulse response function, wherein the impulse response function comprises a time of arrival for each of a plurality of received signals, wherein the decomposing comprises:
    using quadratic interpolation to identify a time of arrival associated with a peak in the impulse response function;
    setting a set V of the impulse response function; and
    computing $V = V - A(t, t_i) + V_0$,
    wherein $t_i$ is the time of arrival associated with the peak in the impulse response;
    identifying a smallest time of arrival from the decomposed impulse response function;
    identifying a time of arrival of the strongest signal;
    storing the time of arrival of the strongest signal;
    eliminating the impulse response of the strongest signal from the impulse response of the received signal;
    repeating the identifying, storing, and eliminating steps for a predetermined number of times; and
    determining the time of arrival of the direct radio signal as the smallest value of the stored time of arrivals.

2. A method for determining a time of arrival of a direct radio signal within a wireless communication network comprising:
    collecting a predetermined number of values of an impulse response function, with the maximum value of the function being included in the set;
    normalizing the data set of collected values and store the normalized values in vector $V_0$;
    setting a set $V = V_0$;
    initializing a vector T with very large values as the approximated time of arrival;

running a decomposition algorithm a predetermined number of times;
replacing the largest value of vector T with the time of arrival ($t_0$) resulting from the decomposition algorithm;
repeating the running and replacing steps for a predetermined number of times; and
identifying the smallest value of T as the earliest time of arrival.

3. A method for determining a time of arrival of a direct radio signal within a wireless communication network as claimed in claim 2, wherein the vector T is initialized to infinity.

4. A method for determining a time of arrival of a direct radio signal within a wireless communication network as claimed in claim 2, wherein the running the decomposition algorithm step comprises:
using quadratic interpolation to find the time of arrival ($t_i$) associated with the peak of the impulse response function for a set V; and
computing $V=V-A(t, t_i)+V_0$.

5. A system for determining a time of arrival of a direct radio signal within a wireless communication network comprising:
a receiver for receiving a plurality of signals, wherein each of the plurality of received signals has an associated time of arrival; and
a processor operating to:
collect a predetermined number of values of an impulse response function, with the maximum value being part of the collected set;
normalize the data set of collected values and store the normalized values in vector $V_0$;
set a set $V=V_0$;
initialize a vector T as the time of arrival;
run the decomposition algorithm;
replace the largest value of T with the time of arrival ($t_0$) resulting from the decomposition algorithm;
repeat the running the decomposition algorithm and replacing operations for a predetermined number of times; and
identify the smallest value of T as the earliest time of arrival.

6. A system for determining a time of arrival of a direct radio signal within a wireless communication network as claimed in claim 5, wherein the decomposition algorithm comprises:
using quadratic interpolation to find the time of arrival ($t_i$) associated with the peak of the impulse response function for a set V; and
computing $V=V-A(t, t_i)+V_0$.

* * * * *